June 29, 1954     R. E. ELLIS     2,682,141
METHOD AND APPARATUS FOR HARVESTING COTTON
Filed June 23, 1948     5 Sheets-Sheet 3
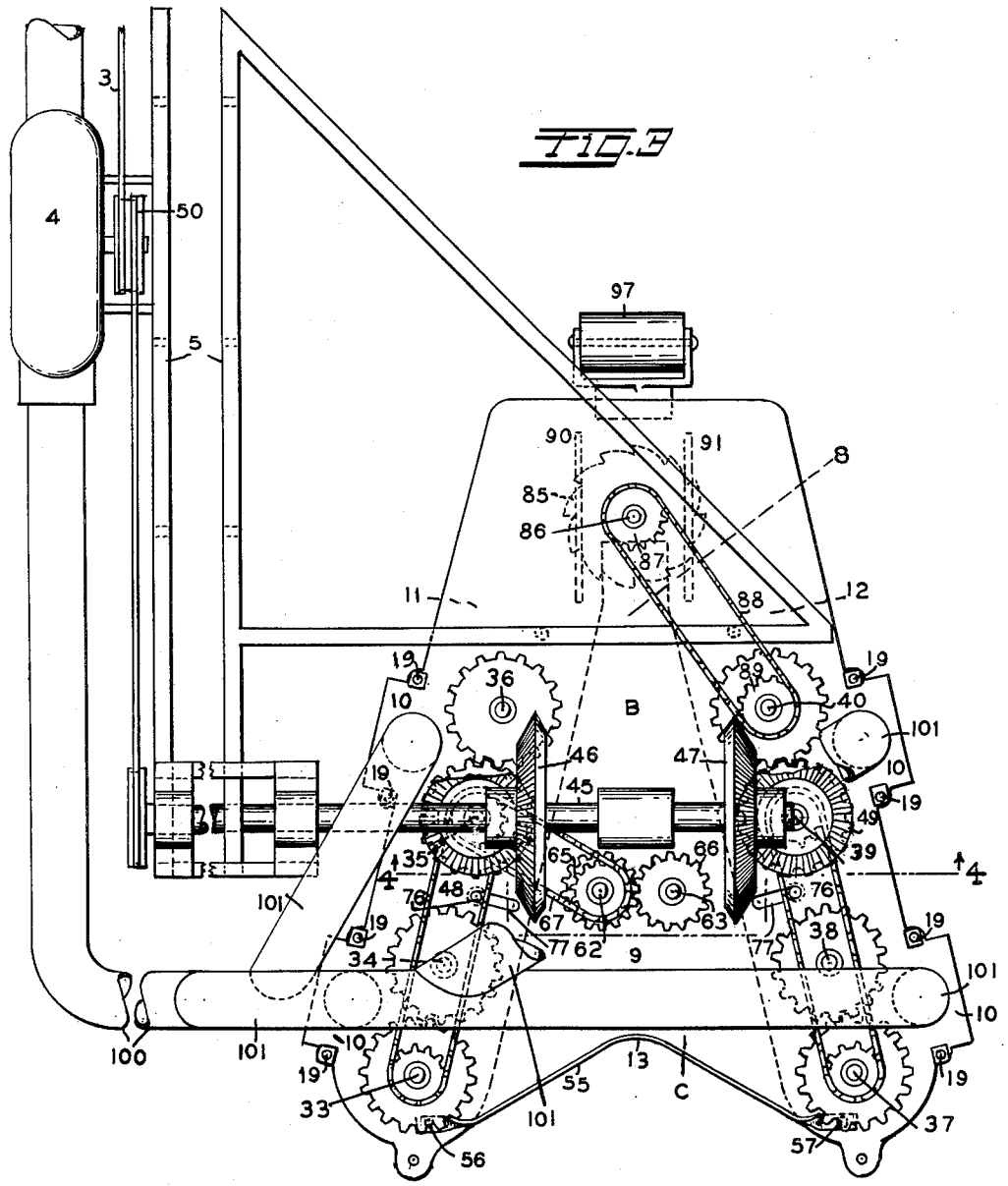
INVENTOR
RILEY E. ELLIS
BY Edward M Fisher June 29, 1954 R. E. ELLIS 2,682,141
METHOD AND APPARATUS FOR HARVESTING COTTON
Filed June 23, 1948 5 Sheets-Sheet 4
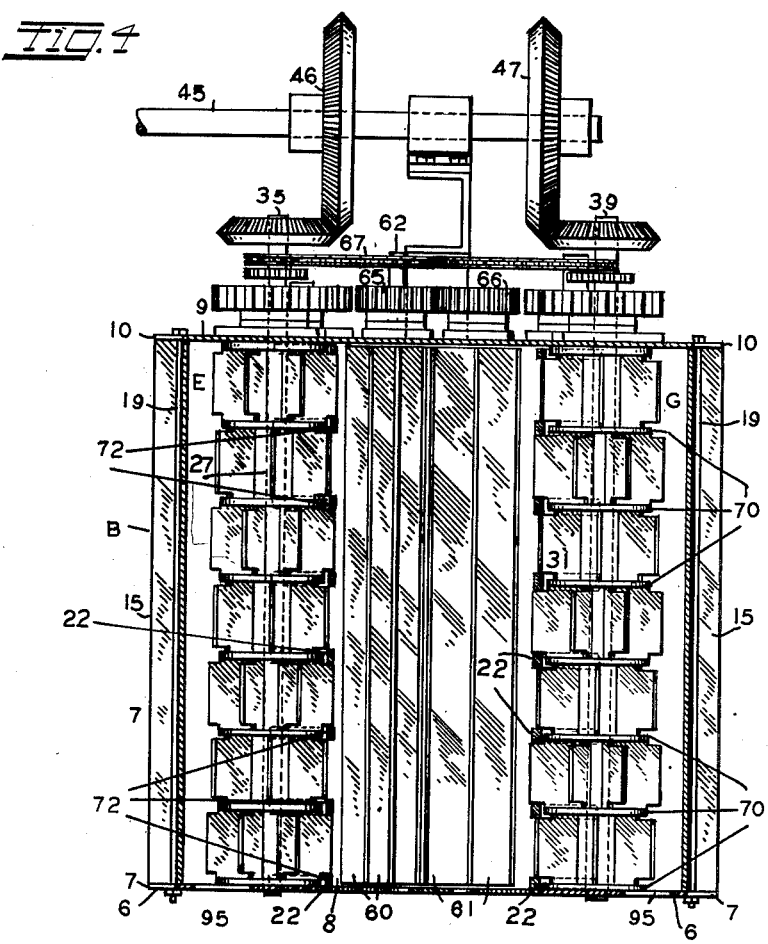
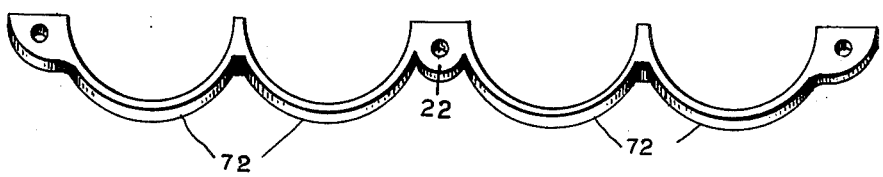
INVENTOR
RILEY E. ELLIS
BY Edward M Fisher

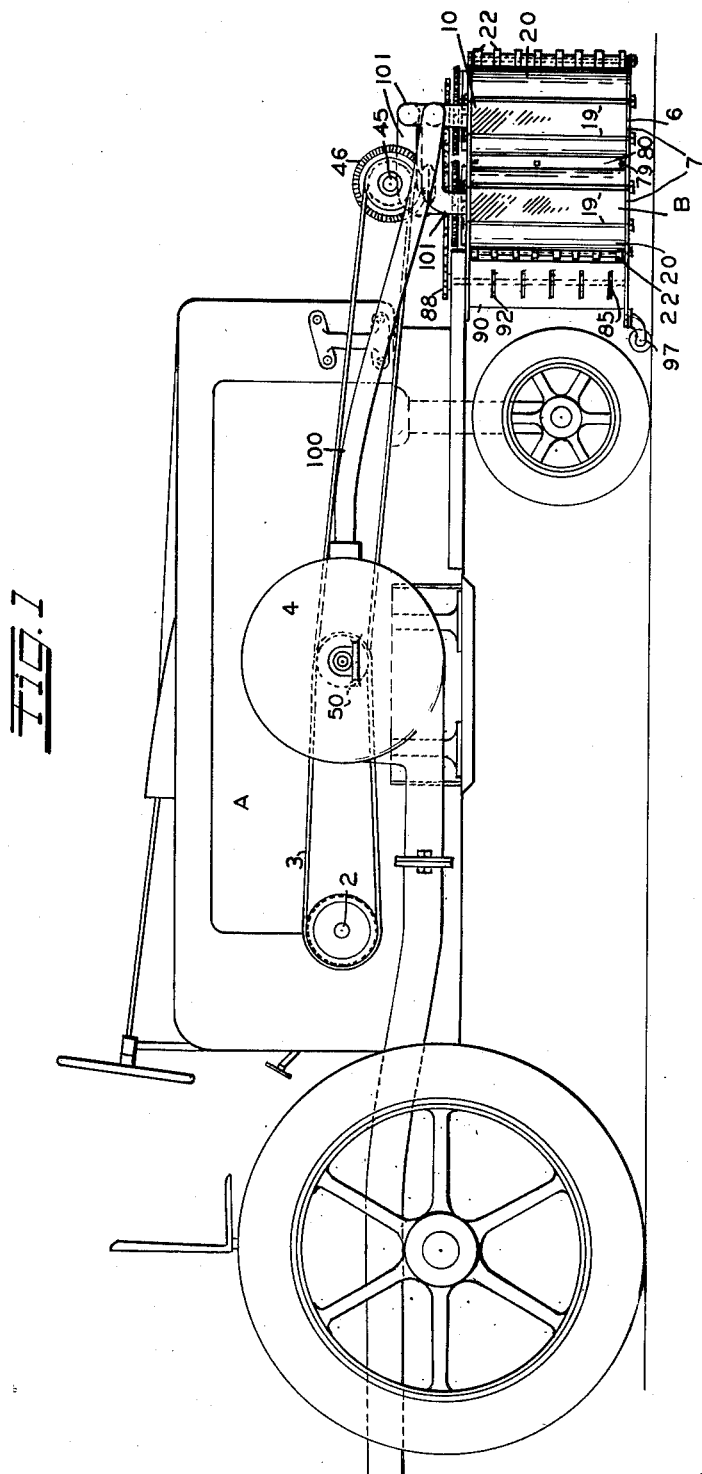

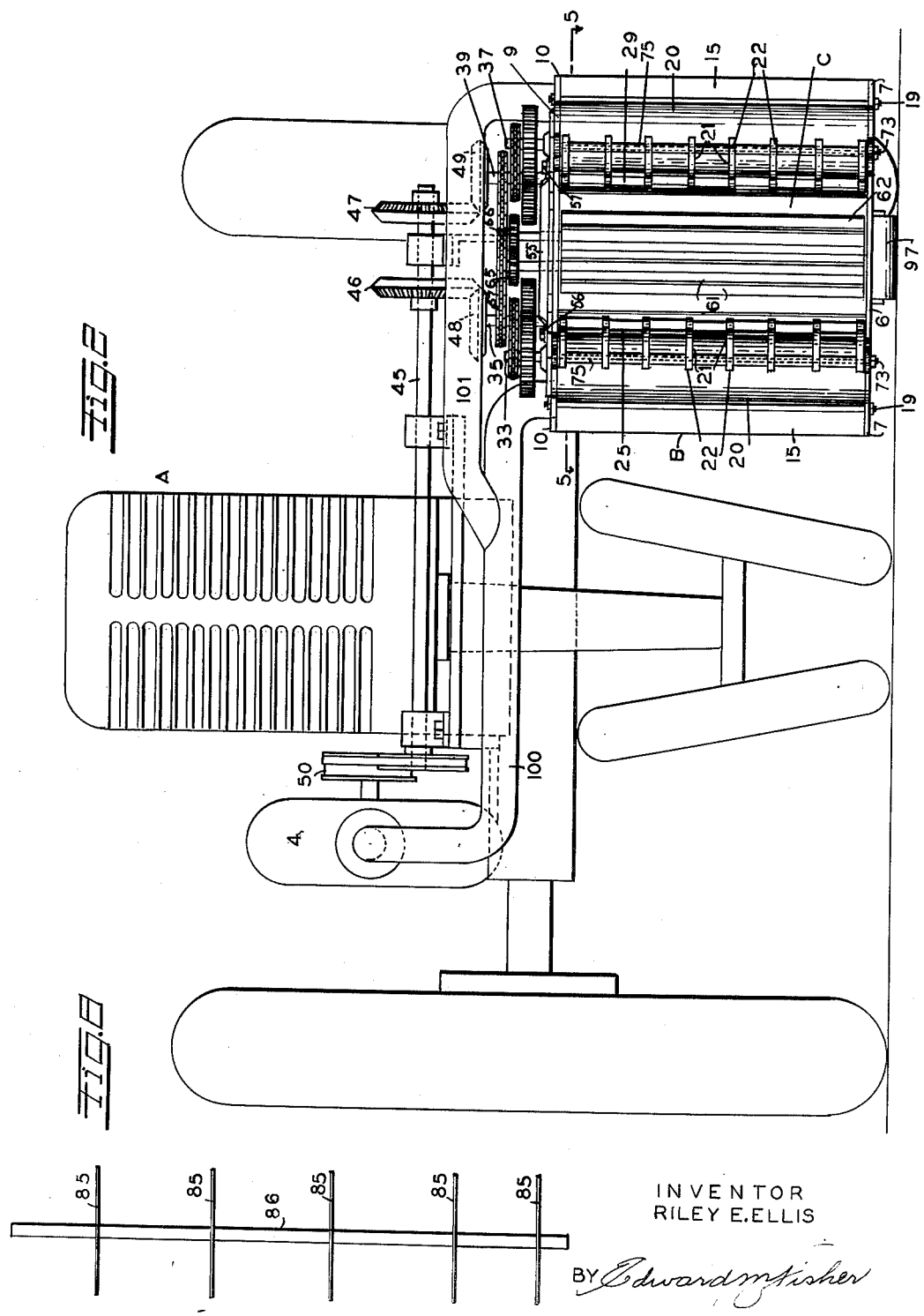

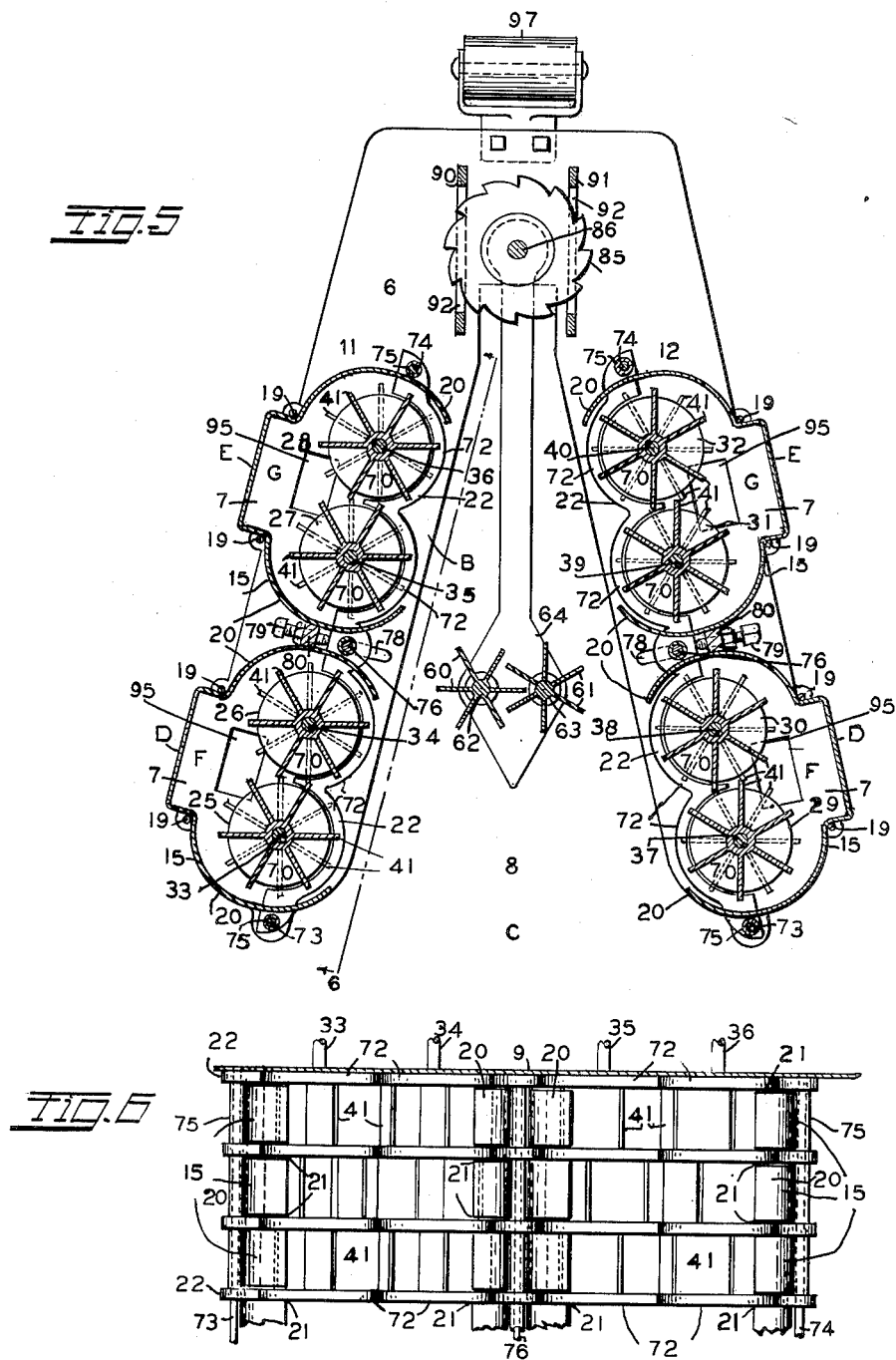

Patented June 29, 1954

2,682,141

UNITED STATES PATENT OFFICE 2,682,141

METHOD AND APPARATUS FOR HARVESTING COTTON

Riley E. Ellis, Griffin, Ga., assignor to Southern Farm Implement Corporation, Orlando, Fla., a corporation of Florida Application June 23, 1948, Serial No. 34,783

21 Claims. (Cl. 56—29)

This invention relates to a cotton picker and more especially to an automatic type removably attached to a motorized vehicle such as a tractor, truck, or the like, each having rotor assembly, powered by the vehicle, for wiping lint from a cotton boll and blowing the removed lint thru an unobstructed passage to a conveyance, or other receptacle, for deposit therein, as may be drawn by the vehicle.

An object of this invention is to provide a cotton picker mechanism, having one or a series of picker units with a rotor assembly, under vehicular draft to converge rows of cotton for the picking thereof, during which operation each unit is lined, by the vehicle driver, on the center of the approached rows of cotton plants, and by the driver all picking operations are manned concurrent with the driving of the vehicle.

A further object is providing a rotor cotton picker mechanism which as a unit converges on a cotton plant, the plant being gathered into the mouth of the unit, placing the bolls into picking contact with rotating beaters, wipers, or the like to wipe the lint from the bolls, after which the lint is deposited in an air passage and therefrom blown to a receptacle.

Another object is to provide means, whereby, after cotton lint is removed from the boll, the stalks are shredded and dropped to the ground and the stubble left in the ground is mashed into the earth to destroy hybridation of the plant for insects.

A further object of this invention is to fluff the lint as it is wiped and pulled from the boll and passed to an air passage from whence it is blown into a receptacle, thereby, rendering the lint capable of being ginned out in longer staple.

A further object is the provision of a cotton picker mechanism substantially light in weight and economical in cost of manufacture.

With these and other objects in view the invention resides substantially in the combination, construction, arrangement and relative location of parts, all in accordance with the disclosure herein.

In the accompanying drawings,

Figure 1 is a side elevation of a tractor with this invention embodied.

Figure 2 is an enlarged front view thereof.

Figure 3 is a plan view of this invention as detached from a vehicle, and showing one type of attaching frame.

Figure 4 is an enlarged sectional view on the line 4—4 Figure 3.

Figure 5 is an enlarged sectional view on the line 5—5 Figure 2.

Figure 6 is a fragmentary elevation on the line 6—6 Figure 5.

Figure 7 is an enlarged perspective view of a type of guard member to withhold trash from the spool wipers during rotation thereof.

Figure 8 is an elevation of the shredding blades embodied in this invention and illustrating the spacing thereof.

The true nature and manner of use of a cotton picker in accordance with this invention will be best understood by a detailed description of the form thereof, shown in the drawings in an illustrative sense.

Now referring more particularly to the drawings A indicates generally one form of motorized vehicle, a tractor, as any other appropriate type may be employed, to which this mechanism is attached and by which it is actuated, said tractor being of a conventional type having a power take-off 2 in controlled relation with the tractor engine (not shown) said take-off in this instance being by means of a belt drive 3, intercepted by a drive 50 for a blower 4, driving the unit driving shaft 45.

A cotton picker unit designated in general as B is attached to the forward portion of the described vehicle by a hanger frame 5, which may be as shown in the drawings for illustrative purpose, or of other design depending on the style of vehicle employed, however the showing of one unit is not to be considered as a limitation, as in some instances.

The unit B includes a substantially forked shaped or bifurcated gathering housing creating vertically disposed forwardly diverging wallings or confines D and E arranged longitudinally as to each other and providing similarly aligned receiving zone spaces F and G oppositely disposed, respectively, each space opening into a central inwardly tapered gathering throat 8 extending longitudinally partially thru said housing and being provided with a forward entrance mouth C. The housing includes a base member 6 having wing portions 7 and extended angular portions 11 and 12, a top plate 9 having wing portions 10 in vertical alignment with the base wing portions 7, the forward end of the said plate 9 having an angular cut 13. The housing also includes upright members 15 disposed between the base 6 and the top plate 9 forming the walls of the spaces F and G, the end walls being curvital as at 20 and slotted as at 21 to permit the placement of guard members 22, hereinafter described, the housing members being tied by means of tie-rods 19.

The lock of cotton fibres is detached by means of rotating beaters, wipers, or the like, 25, 26, 27, 28, 29, 30, 31 and 32, which are mounted on shafts 33, 34, 35, 36, 37, 38, 39 and 40, respectively, for rotation therewith, pairs of such mountings being vertically positioned in the spaces, and said shafts have bearing at their opposite ends in the base member 6 and top plate 9, respectively, with the upper ends extended above the top plate for the mounting of driving mechanism.

Reference to Figure 3 will teach that the individual pairs of beaters, wipers or the like, are rotated in opposite directions as to each other and at equal speeds, these being geared for that purpose.

The beaters, wipers, or the like are in the form of tiers having radial vanes 41 the vanes in adjoining tiers being at alternate angle to each other. The beaters, wipers or the like, are so arranged that each pair of vanes are at angles intermediate to each other and on rotation the vanes of one beater passes intermediate of the other thereby providing clearance between vanes, each pair of vanes and the associated shaft forming an open mouth into which cotton is pressed by the wiper passing intermediate thereof so as to hold the cotton as by a bite while the wipers rotate and until the bite is released by the withdrawal of the wiper intermediate the pair of vanes upon further rotation, as will be apparent.

The beaters or the like are rotated from the drive shaft 45 having mounted thereon bevel gears 46 and 47, respectively, meshed with bevel gears 48 and 49, respectively, thereby directly rotating shafts 35 and 39 and, by means of sprocket connection therewith, rotating shafts 33 and 37, respectively, shafts 34, 36, 38, and 40 being geared for rotation to their paired shaft.

As previously pointed out the top plate 9 has an angular cut 13 in the forward end thereof, the purpose of same being to collect and bend plant limbs extending above the unit, in preparation for the plant to be gathered up by the unit. To this end and as an aid to limb bending and to reinforce the plate 9 at this point I provde a strip of strap metal 55 bent to the contour of said cut, placed on edge thereto, and bolted in place as at 56 and 57.

Rotated concurrent with the beaters, or the like, are vertical blades 60 and 61 formed on shafts 62 and 63, respectively, having parallel bearing at their opposite ends with a horizontal supporting arm 64 and the plate 9, the forward end of said arm 64 being tapered. The shafts 62 and 63 are extended above the plate 9 for mounting of meshed gears 65 and 66 which are rotated by sprocket mechanism 67, connecting shafts 62 and 35. The blades 60 and 61 are rotated in opposite directions and at equal speed, and are arranged as to pass intermediate of each other for clearance of the same.

As the plants are gathered into the throat 8 the base of the limbs is split by the tapered end of support arm 64 and are urged to the beaters, or the like, contact being made therewith, and lint which has not been wiped from the bolls by the forward beaters, or the like, is removed by the aft ones.

Referring to Figure 5 it will be observed that the vanes of the beaters, or the like, protrude outward from tier spacing plates 70 and from experimental operations it has been determined that trash becomes caught between the vanes at this point, therefore, guard members 22 having curvital portions 72 corresponding to the radius of the beaters, or the like, are provided to fill the space between the vanes, said guards being pivotal at their opposite ends on tie rods 73 and 74 and spaced on said rods by spacing tubes 75 according to the depth of the vanes. Central portons of the guard members, which are made of a spring material, are spaced on a rod 76, the opposite ends thereof being engaged in slots 77 and 78, this permits uniform transverse adjustment of the guards at their center by set screws 79 arranged on bracket 80.

In the operation of this cotton picker, as same is conveyed forward plant trash is crowded to the rear of the unit and there shredded by a series of spaced horizontal cutting blades 85, Figures 5 and 8, mounted on a shaft 86 having bearing in the base member 6 and the top housing plate 9, upper end of said shaft extending above the bearing for mounting thereon of driving mechanism comprising a sprocket wheel 87 having extended therefrom a sprocket chain 88 to sprocket wheel 39 on the shaft 40 driving means for the said shaft being previously described.

To prod the trash to the cutting blades there are embodied in this invention side plates 90 and 91 welded at their opposite ends to the base member 6 and the top plate 9, the said plates having slots 92, spaced to the blades, to permit the side plates to intersect the blades so that they may better perform their function.

As the cotton lint is wiped from the boll by the beaters it is cast to the rear of the spaces, then thru means of blower 4 it is picked up by a draft of air which enters the bottom of each space thru apertures 95 and has exit from said housing thru conduits 100 which have communication with said housing at the top thereof and therefrom conduct the lint to a receptacle (not shown), which may be in the form of a trailer drawn by the vehicle during operation thereof, or other suitable means.

The conduit 100 has at the forward portion thereof branches 101 these communicating with the spaces F and G in the confines D and E created by the housing B so that the lint picked up by the draft of air in the latter will be conveyed by the conduit 100 to the receptacle drawn by the vehicle.

It should be apparent that the attachment when worn by the draft element is located fore of the latter in a plane transverse to the line of draft beneath the path of vision of the driver or operator of such vehicle to avoid any interference with observation for proper approach to the rows of cotton plants to be picked. The attachment is fully automatic in the working thereof and it is readily and easily mounted and demounted at will, it being simple in construction, possessed of accessible parts and inexpensive to manufacture and install.

Each unit carries at its rear a trailer wheel 97 whereby stubble in the ground is mashed to destroy hybridation of the plant.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit or the scope of the appended claims.

What is claimed:

1. An attachment of the kind described for a draft element having power transfer, comprising automatic gathering and picking mechanism fore of such element and having mounting therewith for operation in its path of travel without interference to the vision of an operator of such element, means for transferring power from the element to said mechanism, and groups of plural rotary wipers included in said mechanism, arranged opposed and in forwardly divergent relation to one another for picking operation therebetween.

2. An attachment of the kind described for a draft element having power transfer, comprising automatic gathering and picking mechanism fore of such element and having mounting therewith for operation in its path of travel without interference to the vision of an operator of such element, means for transferring power from the element to said mechanism, groups of plural rotary wipers included in said mechanism, arranged opposed and in forwardly divergent relation to one another for picking operation therebetween, and cutting mechanism coacting with said mechanism aft of the wipers.

3. An attachment of the kind described for a draft element having power transfer, comprising automatic gathering and picking mechanism fore of such element and having mounting therewith for operation in its path of travel without interference to the vision of an operator of such element, means for transferring power from the element to said mechanism, groups of plural rotary wipers included in said mechanism, arranged opposed and in forwardly divergent relation to one another for picking operation therebetween, cutting mechanism coacting with said mechanism aft of the wipers, and plant bending means in advance of the wipers.

4. An attachment of the kind described for a draft element having power transfer, comprising automatic gathering and picking mechanism fore of such element and having mounting therewith for operation in its path of travel without interference to the vision of an operator of such element, means for transferring power from the element to said mechanism, group of plural rotary wiper included in said mechanism, arranged opposed and in forwardly divergent relation to one another for picking operation therebetween, cutting mechanism coacting with said mechanism aft of the wipers, plant bending means in advance of the wipers, and guards for said wipers.

5. An attachment of the kind described for a draft element having power transfer, comprising automatic gathering and picking mechanism fore of such element and having mounting therewith for operation in its path of travel without interference to the vision of an operator of such element, means for transferring power from the element to said mechanism, groups of plural rotary wipers included in said mechanism, arranged opposed and in forwardly divergent relation to one another for picking operation therebetween, cutting mechanism coacting with said mechanism aft of the wipers, plant bending means in advance of the wipers, guards for said wipers, and means for lateral adjustment of the central portion of said guards as to the wipers.

6. An attachment of the kind described for a draft element having power transfer, comprising automatic gathering and picking mechanism fore of such element and having mounting therewith for operation in its path of travel without interference to the vision of an operator of such element, means for transferring power from the element to said mechanism, groups of plural rotary wipers included in said mechanism, arranged opposed and in forwardly divergent relation to one another for picking operation therebetween, cutting mechanism coacting with said mechanism aft of the wipers, plant bending means in advance of the wipers, guards for said wipers, and rotary gathering means centered between the opposed wipers.

7. An attachment of the kind described for a draft element having power transfer, comprising automatic gathering and picking mechanism fore of such element and having mounting therewith for operation in its path of travel without interference to the vision of an operator of such element, means for transferring power from the element to said mechanism, groups of plural rotary wipers included in said mechanism, arranged opposed and in forwardly divergent relation to one another for picking operation therebetween, cutting mechanism coacting with said mechanism aft of the wipers, guards for said wipers, rotary gathering means centered between the opposed wipers, and conveyor means coacting with the picking mechanism for deposit of the pickings aft of the draft element.

8. An attachment of the kind described for a draft element having power transfer, comprising automatic gathering and picking mechanism fore of such element and having mounting therewith for operation in its path of travel without interference to the vision of an operator of such element, means for transferring power from the element to said mechanism, groups of plural rotary wipers included in said mechanism, arranged opposed and in forwardly divergent relation to one another for picking operation therebetween, cutting mechanism coacting with said mechanism aft of the wipers, rotary gathering means centered between the opposed wipers, conveyor means coacting with the picking mechanism for deposit of pickings aft of the draft element, and means for operating the conveyor means by the said draft element.

9. An attachment of the kind described for a draft element having power transfer, comprising automatic gathering and picking mechanism fore of such element and having mounting therewith for operation in its path of travel without interference to the vision of an operator of such element, means for transferring power from the element to said mechanism, groups of plural rotary wipers included in said mechanism, arranged opposed and in forwardly divergent relation to one another for picking operation therebetween, cutting mechanism coacting with said mechanism aft of the wipers, rotary gathering means centered between the opposed wipers, conveyor means coacting with the picking mechanism for deposit of pickings aft of the draft element, means for operating the conveyor means by the said draft means, and a trailer wheel beneath the mechanism.

10. An attachment of the kind described for a draft element having power transfer, comprising automatic gathering and picking mechanism fore of such element and having mounting therewith for operation in its path of travel without interference to the vision of an operator of such element, means for transferring power from said element to said mechanism, groups of plural rotary wipers included in said mechanism, arranged opposed and in forwardly divergent relation to one another for picking operation therebetween, guards for said wipers, rotary gathering means centered between the opposed wipers, conveyor means coacting with the picking mechanism for deposit of pickings aft of the draft element, means for operating the conveyor means by the said draft means, and means for detachably mounting the mechanism to the draft element.

11. An attachment of the kind described for a draft element having power transfer, comprising automatic gathering and picking mechanism fore of such element and having mounting therewith for operation in its path of travel without interference to the vision of an operator of such element, means for transferring power from said element to said mechanism, groups of plural rotary wipers included in said mechanism, arranged opposed and in forwardly divergent relation to one another for picking operation therebetween, cutting mechanism coacting with said mechanism aft of the wipers, rotary gathering mean centered between the opposed wipers, conveyor means coacting with the picking mechanism for deposit of the pickings aft of the draft element, and means for operating the conveyor means by the said draft means, means for detachably mounting the mechanism to the draft element, the wipers being disposed in their groups in vertical tier relation to each other.

12. The method of harvesting seed cotton from the bolls on the limbs of cotton stalks including the steps of folding the limbs of the plant toward the stalk, wiping the seed cotton from the bolls, biting the seed cotton to hold it while removing it to a receiving zone, and doffing said seed cotton in said receiving zone.

13. The method of harvesting seed cotton from the bolls on the limbs or cotton stalks including the steps of folding the limbs of the plant toward the stalk, wiping the seed cotton from the bolls, blowing upon the seed cotton to move it, and biting the seed cotton to hold it while removing it to a receiving zone, and doffing said seed cotton in said receiving zone.

14. The method of harvesting seed cotton from the bolls on the limbs of cotton stalks including the steps of folding the limbs of the plant toward the stalk, wiping the seed cotton from the bolls, biting the seed cotton to hold it while removing it to a receiving zone, and doffing said seed cotton in said receiving zone by means of centrifugal force.

15. The method of harvesting seed cotton from the bolls on the limbs of cotton stalks including the steps of folding the limbs of the plant toward the stalk, wiping the seed cotton from the bolls, blowing upon the seed cotton to move it, biting the seed cotton to hold it while imparting a rotary motion thereto, and doffing said seed cotton in a receiving zone by means of centrifugal force.

16. In a machine for harvesting seed cotton from the bolls on the limbs of cotton stalks, wiper means for wiping seed cotton from the bolls, and means operatively associated with said wiper means to bite the seed cotton to hold it while imparting a rotary motion thereto, said last mentioned means being constructed and arranged to release said bite to doff said seed cotton in a predetermined zone.

17. In a machine for harvesting seed cotton from the bolls on the limbs of cotton stalks, wiper means for wiping seed cotton from the bolls, means positioned ahead of said wiper means for folding the limbs of the plant toward the stalk, means operatively associated with said wiper means for blowing the seed cotton into a predetermined zone relative thereto, and means for biting the seed cotton to hold it while imparting a rotary motion thereto, said last mentioned means being constructed and arranged to doff said seed cotton in another predetermined zone by means of centrifugal force.

18. In a machine for harvesting seed cotton from the bolls on the limbs of cotton stalks, wiper means for wiping seed cotton from the bolls, means operatively associated with said wiper means for blowing the seed cotton into a predetermined zone relative thereto, and means to bite the seed cotton to hold it while imparting a rotary motion thereto, said last mentioned means being constructed and arranged to release said bite to doff said seed cotton in another predetermined zone.

19. In a machine for harvesting seed cotton from the bolls on the limbs of cotton stalks, wiper means for wiping seed cotton from the bolls, means positioned ahead of said wiper means for folding the limbs of the plant toward the stalk, and means to bite the seed cotton to hold it while imparting a rotary motion thereto, said last mentioned means being constructed and arranged to release said bite to doff said seed cotton in another predetermined zone by means of centrifugal force.

20. In a machine for harvesting seed cotton from the bolls on the limbs of cotton stalks, wiper means for wiping seed cotton from the bolls, means positioned ahead of said wiper means for folding the limbs of the plant toward the stalk, means operatively associated with said wiper means for blowing the seed cotton into a predetermined zone relative thereto, and means to bite the seed cotton to hold it while imparting a rotary motion thereto, said last mentioned means being constructed and arranged to release said bite to doff said seed cotton in another predetermined zone by means of centrifugal force.

21. In a machine for harvesting seed cotton from the bolls on the limbs of cotton stalks, wiper means for wiping seed cotton from the bolls, means positioned ahead of said wiper means for folding the limbs of the plant toward the stalk, means operatively associated with said wiper means for blowing the seed cotton into a predetermined zone relative thereto, and means to bite the seed cotton to hold it while imparting a rotary motion thereto, said last mentioned means being constructed and arranged to release said bite to doff said seed cotton in another predetermined zone by means of centrifugal force.

References Cited in the file of this patent

UNITED STATES PATENTS

| Number | Name | Date |
| --- | --- | --- |
| 313,421 | Haselton | Mar. 3, 1885 |
| 755,375 | Logan | Mar. 22, 1904 |
| 920,636 | Owen | May 4, 1909 |
| 1,755,507 | Janacek | Apr. 22, 1930 |
| 1,778,587 | Crumley | Oct. 14, 1930 |
| 1,836,123 | Palmer | Dec. 15, 1931 |
| 1,938,264 | Templeton | Dec. 5, 1933 |
| 2,001,078 | Court | May 14, 1935 |
| 2,208,570 | Box | July 23, 1940 |
| 2,354,112 | Garst | July 18, 1944 |
| 2,451,130 | Townsend | Oct. 12, 1948 |